Nov. 6, 1962 E. F. HAMILTON 3,062,583
INFANT'S CAR SEAT AND CRIB
Filed Nov. 30, 1959 2 Sheets-Sheet 1
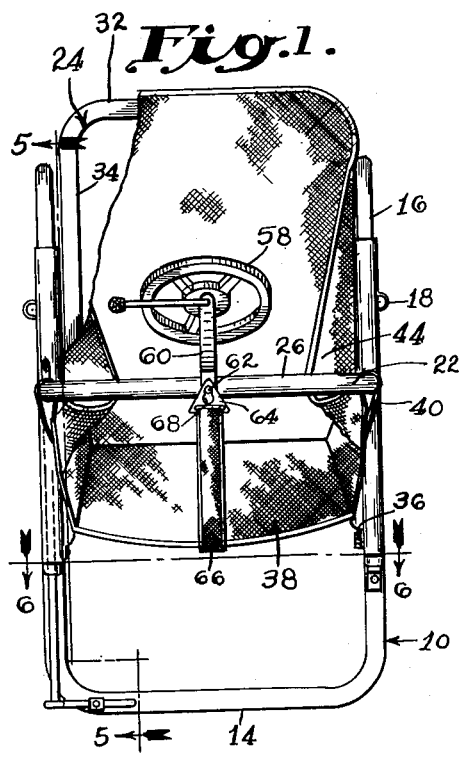
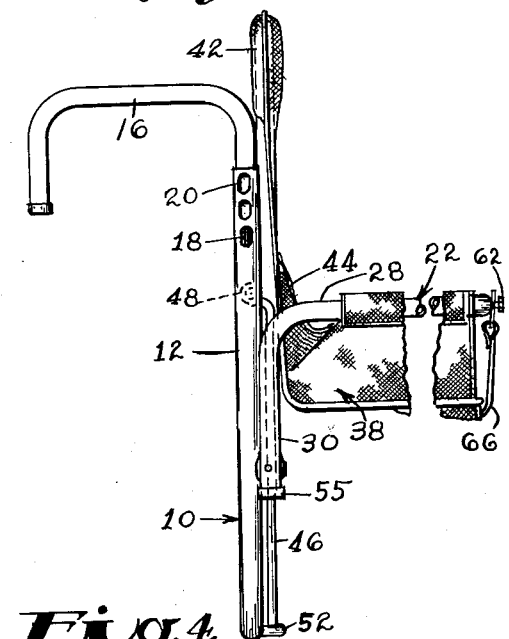
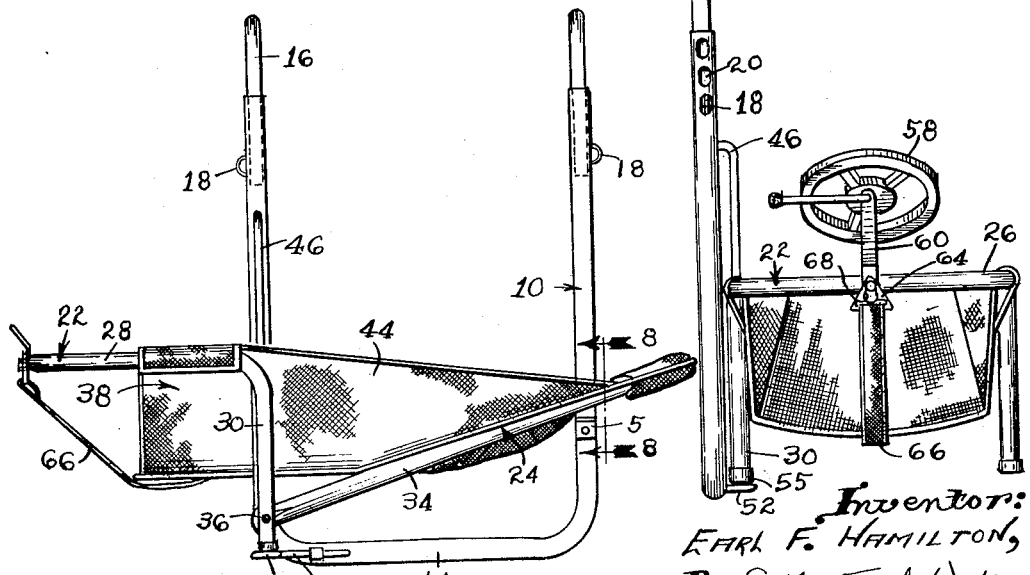
Inventor:
EARL F. HAMILTON,
By Schlay, Track & Jenkins
Attorneys.

Nov. 6, 1962 E. F. HAMILTON 3,062,583
INFANT'S CAR SEAT AND CRIB
Filed Nov. 30, 1959 2 Sheets-Sheet 2
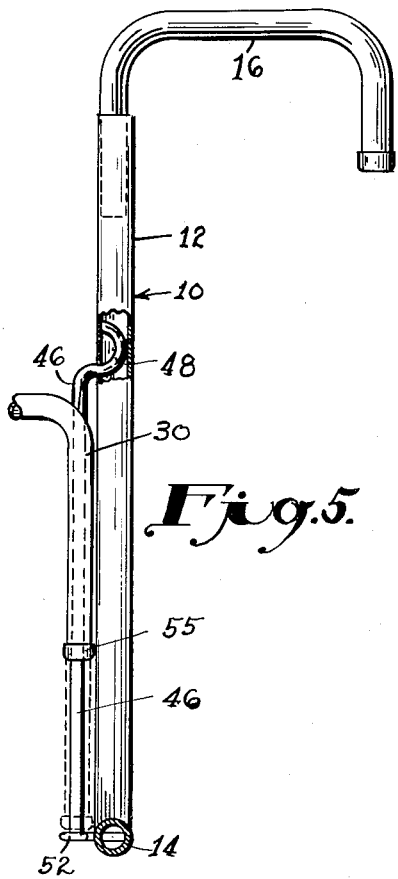
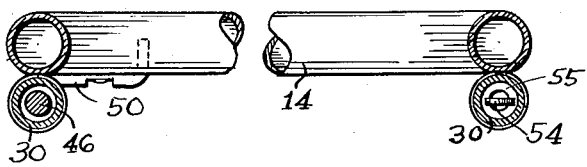
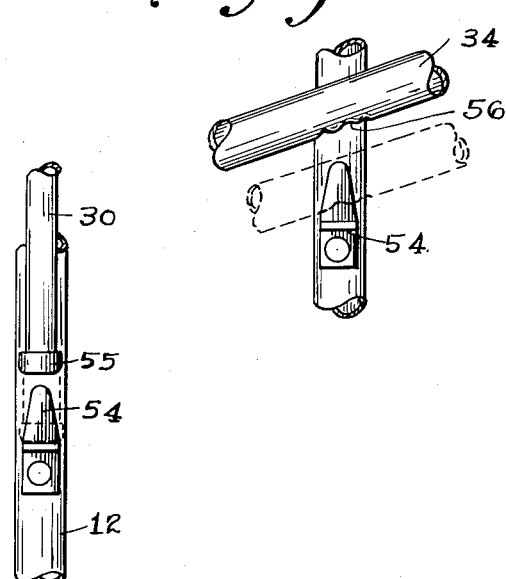
INVENTOR.
EARL F. HAMILTON,
BY
Schley, Trask & Jenkins
Attorneys.

United States Patent Office 3,062,583
Patented Nov. 6, 1962

3,062,583
INFANT'S CAR SEAT AND CRIB
Earl F. Hamilton, Columbus, Ind., assignor to Hamilton Cosco, Inc., Columbus, Ind., a corporation of Indiana
Filed Nov. 30, 1959, Ser. No. 856,085
14 Claims. (Cl. 297—118)

This invention relates to a combination infant's car seat and crib, and has for its object the provision of a combination infant's car seat and crib which can be easily mounted on an automobile seat back, which can be manufactured largely from inexpensive metal-tubing, which is easily convertible from an infant's car seat to a crib and vice versa, which is adjustable for use by various size infants, and which is collapsible for more compact storage and shipment.

According to the preferred form of my invention, there is provided a supporting frame having a pair of hooks connected thereto which are receivable over the upper edge of an automobile seat back. A pivotally interconnected seat and back frame, conveniently provided with a fabric-type sling constituting the infant-supporting surfaces therefor, are carried on said supporting frame. The seat and back frames are swingably and vertically movable with respect to the supporting frame for moving them to and from their seat and crib-forming positions. Preferably, means are provided on the supporting frame for releasably locking the seat and back frames thereon in said seat and crib-forming positions.

Other objects and features of my invention will become apparent from the more detailed description which follows and from the accompanying drawings, in which:

FIG. 1 is a front elevation of my invention showing the same in its seat-forming position;

FIG. 2 is a side elevation of the structure illustrated in FIG. 1;

FIG. 3 is a front elevation of my invention, but showing the same in its crib-forming position;

FIG. 4 is a side elevation of the structure illustrated in FIG. 3;

FIG. 5 is a vertical section taken on the line 5—5 of FIG. 1;

FIG. 6 is a horizontal section taken on the line 6—6 of FIG. 1;

FIG. 7 is a fragmentary vertical section showing means for releasably locking my structure in its seat-forming position; and FIG. 8 is a fragmentary vertical section similar to FIG. 7, but showing means for releasably locking my structure in its crib-forming position.

As shown, my invention is directed to a combination infant's car seat and crib adapted to be supported on an automobile seat back. The structure comprises a supporting frame 10 conveniently formed from a length of metal-tubing bent into a generally U-shape to provide a pair of generally parallel legs 12 interconnected at their lower ends by a transversely extending bight 14. A pair of generally U-shaped hooks 16 also formed from lengths of metal-tubing are slidably and rotatably received in the upper ends of the frame legs 12. Conveniently, as shown in FIGS. 1 and 2, each of the hooks 16 is provided with a spring-biased detent 18 adjustably receivable in a plurality of spaced vertically aligned opening 20 formed in the frame legs 12 adjacent the upper ends thereof. In this manner, the telescoping frame legs 12 and hooks 16 are adjustable to adjust the effective height of the supporting frame 10 with respect to the automobile seat back upon which it is mounted. Further, by disengaging the detents 18 from the slots 20, the hooks 16 may be rotated into collapsed position in which they lie in planes generally coplanar with the supporting frame 10. Thus, when the hooks 16 are disposed in operative position as shown in FIG. 2, they are receivable over the upper edge of an automobile seat back to support the frame 10 against one of the faces thereof.

The seat and crib are formed by pivotally interconnected seat and back frames 22 and 24 respectively, which are conveniently formed from lengths of metal-tubing. As shown in FIGS. 1 and 2, the seat frame 22 has a generally U-shape comprising a transversely extending bight 26 interconnecting a pair of parallel horizontal stretches 28 having their ends bent downwardly to form vertically extending stretches 30. The back frame 24 also has a generally U-shaped configuration formed by an upper transverse stretch 32 interconnecting a pair of parallel legs 34. As shown, the back frame 24 has a lateral extent slightly smaller than the lateral extent of both the supporting frame 10 and the seat frame 22, and a length greater than the lateral extent of the supporting frame 10. Pivotal connection between the seat and back frames is provided by bolts or rivets 36 swingably interconnecting the lower ends of the back frame legs 34 and the downwardly extending seat frame stretches 30.

As shown in FIG. 1, the supporting surfaces of the seat and back frames are provided by a fabric-type sling 38 having its lateral edges hemmed, as at 40, over the stretches 28 of the seat frame 22, and provided with an inverted pocket 42 adapted to fit snugly over the upper transverse stretch 32 of the back frame 24. Conveniently, as shown in FIG. 1, the sling has a greater lateral extent than the seat and back frames to afford an excess of fabric along the lateral edges of the sling, as at 44 which serves to form the crib side walls, as will be more fully explained hereinafter.

In order to convert my structure from an infant's car seat to a crib, and vice versa, the seat and back frames are swingably and vertically movable with respect to the supporting frame 10. To this end, a vertically extending rod 46 is mounted on one of the supporting frame legs 12, as shown in FIG. 5. As shown, the rod 46 extends through one of the downwardly extending stretches 30 of the seat frame 22, and projects outwardly from the ends of said stretch to thus permit the seat frame 22 to be vertically and swingably movable thereon. The rod 46 is mounted on the leg 12, in spaced relation thereto, with its upper end being curved, as at 48, for locking reception in an opening formed in the forwardly presented face of the leg 12. The lower end of the rod 46 is carried in a bracket 50 rigidly mounted on the forward face of the bight 14 of the supporting frame. As shown in FIG. 5, one end of the bracket 50 is provided with an expanded portion 52 and adapted to engage and support the lower end of the adjacent downwardly extending stretch 30 of the seat frame 22 when said seat frame is in its extreme lowered position.

The leg 12 of the supporting frame 10 opposite the leg carrying the rod 46 is provided with an upwardly extending finger 54 on which the other of the seat frame stretches 30 is receivable, as shown in FIG. 6. In this manner, the finger 54 releasably locks and supports the seat frame 22, and thus the back frame 24, on the supporting frame 10 in a seat-forming position in which the seat and back frames are disposed in the plane of said supporting frame. In this seat-forming position, the back frame 24 is swingable through the plane of the support-frame 10 to rest against the automobile car seat back. Conveniently, the lower ends of the downturned stretches 30 of the seat frame may be provided with caps 55, one of said caps being apertured for sliding movement of the rod 46 and the other of said caps being notched for reception on the locking finger 54.

To convert my structure from an infant's car seat, as shown in FIG. 1, to an infant's crib, as shown in FIGS. 3 and 4, the seat frame 22 is slid upwardly on the rod 46 to disengage it from the locking finger 54. The seat and back frames are then swung about the axis of the rod 46 until they lie in a plane normal to the plane of the supporting frame 10. With the seat and back frames thus positioned, they are moved downwardly on the rod 46 until the seat frame 22 is in its extreme lowered position in which it is resting on the expanded portion 52 of the bracket 50. The back frame 24, which has a greater length than the width of the supporting frame 10, is then swung downwardly about its pivotal connections to the seat frame until a slot 56 formed in one of its legs 34 is received over the locking finger 54, thereby releasably locking the seat and back frames in their crib-forming positions. As shown in FIG. 3, movement of the back frame 24 into its crib-forming position will stretch the excess fabric 44 along the lateral edges of the sling 38 to form a pair of crib side walls. To convert the structure from a crib to a car seat, the sequence of steps just described is merely reversed.

Conveniently, my structure may be further provided with a steering wheel 58 mounted in any convenient manner on a post 60. As shown in FIG. 1, the lower end of the post 60 is mounted on the transverse stretch 26 of the seat frame 22 by a shouldered bolt 62 having its head spaced outwardly from said transverse stretch. Receivable on the shank of the bolt 62 between the head thereof and the seat frame stretch 26 is a catch 64 connected to a crotch strap 66 on the sling 38. As shown, the catch 64 is provided with a keyhole-shaped opening 68 to permit said catch to be easily received over the head of the bolt 62.

While I have described my combination seat and crib as being mountable on an automobile seat, it is to be understood, of course, that, my seat and crib may be mounted on any desired article, such as a settee, chair, bed, etc. having means over which the hooks 16 may be received.

I claim as my invention:

1. A combination infant's car seat and crib, comprising a seat frame and a back frame, flexible means on said seat and back frames providing the infant-supporting surfaces therefor, said back frame being swingably connected to the seat frame on a horizontal axis transverse to the seat frame for swinging movements from an upright position in which said seat and back frames and said supporting surfaces form an infant's car seat to a reclining position in which said seat and back frames and their supporting surfaces form an infant's crib, supporting means receivable on an automobile seat back and connected to said seat frame for supporting said seat and back frames thereon, said seat frame being swingably mounted on said supporting means on a vertical axis for swinging movement between said car seat-forming position in which said horizontal axis is parallel with said automobile seat back and said back frame is maintained in an upright position and said crib-forming position in which said horizontal axis is normal to said automobile seat back and said back frame is in its reclining position, and means for releasably locking said seat and back frames in their seat and crib-forming positions.

2. A combination infant's car seat and crib as set forth in claim 1 in which said back frame is swingable through the plane of the supporting means when it is in its car seat-forming position to rest against the automobile seat back.

3. A combination infant's car seat and crib, comprising a seat frame and a back frame, flexible means on said seat and back frames providing the infant-supporting surfaces therefor, said back frame being swingably connected to the seat frame about a horizontal axis transverse to said seat frame for swinging movement from an upright position in which said seat and back frames and said supporting surfaces form an infant's car seat to a reclining position in which said seat and back frames and said supporting surfaces form an infant's crib, a pair of hooks receivable over an automobile seat back, a supporting frame connected to said hooks for supporting said seat and back frames thereon, said seat frame being swingably mounted on said supporting frame on a vertical axis for swinging movement between said car-seat-forming position in which said horizontal axis is parallel with said automobile seat back and said seat back frame is maintained in an upright position and said crib-forming position in which said horizontal axis is normal to said automobile seat back and said back frame is in its reclining position, and locking means on said supporting frame engageable with the seat frame for releasably locking said seat and back frames in their seat-forming positions and engageable with said back frame for releasably locking said seat and back frames in their crib-forming positions.

4. A combination infant's car seat and crib as set forth in claim 3 in which said supporting frame has a pair of generally parallel tubular legs and said pair of hooks are rotatably and vertically adjustable in said legs.

5. A combination infant's car seat and crib, comprising a seat, a back pivotally connected to said seat on a horizontal axis transverse to said seat for swinging movement between upright and reclining positions, supporting means receivable on an automobile seat back and having a pair of interconnected spaced parallel members adapted to be disposed against a face of a car seat back, means on one of said pair of members swingably supporting said seat thereon on a vertical axis for swinging movement of said seat and back between a position in which said horizontal axis is parallel with said automobile seat back and a position in which said horizontal axis is normal to said automobile seat back, and locking means on the other of said pair of members for releasably locking said seat in a position to dispose said horizontal axis parallel with said automobile seat back whereby said back is maintained in an upright position and said seat and back form an infant's car seat and for releasably locking said back in its reclining position when said seat and back are swung into position to dispose said horizontal axis normal to said automobile seat back, said seat and reclining back forming a crib.

6. A combination infant's car seat and crib as set forth in claim 5 in which said seat and back are formed from a seat frame and a back frame having supporting surfaces mounted thereon, said seat frame comprising a length of metal-tubing bent into a generally U-shaped configuration and having its ends bent normal to the plane of said U-shaped configuration, and said means on said one of said pair of members comprises a rod connected to said one of said pair of members and extending through one of the ends of said seat frame.

7. A combination infant's car seat and crib as set forth in claim 6 in which said seat frame is rotatably and slidably carried on said rod.

8. A combination infant's car seat and crib, comprising a seat frame, a back frame pivotally connected to said seat frame, means on said seat and back frames to provide the infant-supporting surfaces therefor, supporting means receivable on an automobile seat back and having a pair of interconnected spaced parallel mambers adapted to be disposed against a face of an automobile car seat back, means on one of said pair of members swingably supporting said seat frame thereon, and locking means on the other of said pair of members for releasably locking said seat frame in a position to support said seat and back frames in a seat-forming position in a plane parallel to the plane of the supporting means and releasably locking said back frame in a reclining position to form an infant's crib when said seat and back frames are swung into a plane normal to the plane of the supporting means.

9. A combination infant's car seat and crib, comprising a seat frame, a back frame pivotally connected to said seat frame on a horizontal axis transverse to said seat frame for swinging movement between upright and reclining positions, a fabric-type sling mounted on said seat and back frames to form the supporting surfaces therefor, supporting means for supporting said seat and back frames on an automobile seat back, said seat and back frames being swingably carried on said supporting means for movement between a car seat-forming position in which said horizontal axis is parallel with said automobile seat back and the back frame is maintained in its upright position and a crib-forming position in which said horizontal axis is normal to said automobile seat back and the back frame is swung into its reclining position, and means for releasably locking said seat and back frames in their car seat and crib-forming positions.

10. A combination infant's car seat and crib as set forth in claim 9 in which said sling has a greater lateral extent than the seat and back frames to form a pair of crib side walls when said seat and back frames are in crib-forming position.

11. A combination infant's car seat and crib, comprising a supporting frame having a pair of interconnected spaced parallel leg members and adapted to be mounted on an automobile car seat back, a generally U-shaped seat frame having a pair of stretches bent normal to its general plane, a back frame having a length greater than the spacing between said leg members and having its lower end pivotally connected on a transverse horizontal axis to the lower ends of said stretches on the seat frame for swinging movement between upright and reclining positions, one of said seat frame stretches being swingably and slidably carried on a rod mounted on one of said leg members, said seat frame being swingable between a position in which said horizontal axis is parallel to the automobile seat back and the back frame is maintained in its upright position and a crib-forming position in which said horizontal axis is normal to said automobile seat back and said back frame is swung into its reclining position, and locking means on the other of said pair of leg members engageable with the other of said seat frame stretches for releasably locking said seat frame in a position to support the seat and back frames in said car seat-forming position and engageable with said back frame for releasably locking said back frame in said crib-forming position.

12. A combination infant's car seat and crib as set forth in claim 11 in which means are provided on said rod for supporting the seat frame thereon when said seat and back frames are in a crib-forming position.

13. A combination infant's car seat and crib as set forth in claim 11 with the addition that a fabric-type sling is carried on said seat and back frames, said sling having a crotch strap adapted to be releasably connected to the forward edge of said seat frame.

14. A combination infant's car seat as set forth in claim 13 with the addition said seat frame is provided with means for connecting the crotch strap thereto and for supporting a steering wheel thereon.

References Cited in the file of this patent

UNITED STATES PATENTS

| | | |
|---|---|---|
| 2,508,688 | Rossi | May 23, 1950 |
| 2,690,787 | Soltis | Oct. 5, 1954 |
| 2,709,478 | Golding et al. | May 31, 1955 |
| 2,730,163 | Goldberg | Jan. 10, 1956 |
| 2,924,266 | Goldberg | Feb. 9, 1960 |

FOREIGN PATENTS

| | | |
|---|---|---|
| 1,123,784 | France | June 18, 1956 |